United States Patent
Lombrozo (10) Patent No.: US 10,307,800 B1
(45) Date of Patent: Jun. 4, 2019

(54) SELF-CLEANING SPINNING COVER

(71) Applicant: Waymo LLC, Mountain View, CA (US)

(72) Inventor: Peter Craig Lombrozo, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 63 days.

(21) Appl. No.: 15/228,305

(22) Filed: Aug. 4, 2016

(51) Int. Cl.
*B08B 3/02* (2006.01)
*B60S 1/46* (2006.01)
*B08B 3/10* (2006.01)

(52) U.S. Cl.
CPC .............. *B08B 3/10* (2013.01); *B08B 3/02* (2013.01); *B60S 1/46* (2013.01)

(58) Field of Classification Search
CPC ............ B08B 3/10; B08B 3/02; B60S 1/46
See application file for complete search history.

(56) References Cited

U.S. PATENT DOCUMENTS

| | | | | |
|---|---|---|---|---|
| 4,320,949 A | * | 3/1982 | Pagano | G03B 17/08 219/201 |
| 5,708,859 A | * | 1/1998 | Tajima | G02B 27/0006 396/25 |
| 6,203,204 B1 | | 3/2001 | Carmichael | |
| 6,527,000 B1 | * | 3/2003 | Randmae | B08B 3/024 134/102.1 |
| 6,642,709 B2 | | 11/2003 | Heimann, Jr. et al. | |
| 8,317,414 B2 | * | 11/2012 | Jones | G03B 17/02 396/427 |
| 8,567,963 B1 | * | 10/2013 | Criscuolo | B08B 1/006 359/507 |
| 2003/0146831 A1 | * | 8/2003 | Berberich | B60R 11/04 340/461 |
| 2005/0025360 A1 | * | 2/2005 | Gin | G06K 9/00221 382/181 |
| 2006/0017842 A1 | * | 1/2006 | Jun | G03B 37/02 348/373 |
| 2008/0072393 A1 | * | 3/2008 | Tanaka | A47L 1/02 15/250.03 |
| 2008/0231699 A1 | * | 9/2008 | Konishi | G03B 37/02 348/143 |
| 2009/0162048 A1 | * | 6/2009 | Tatewaki | G03B 17/02 396/427 |
| 2009/0250533 A1 | * | 10/2009 | Akiyama | B60S 1/381 239/284.1 |
| 2011/0073142 A1 | * | 3/2011 | Hattori | B60S 1/0848 134/56 R |

(Continued)

FOREIGN PATENT DOCUMENTS

JP 2007333188 A 12/2007

*Primary Examiner* — Benjamin L Osterhout
(74) *Attorney, Agent, or Firm* — Botos Churchill IP Law (57) ABSTRACT

The technology relates to a system for clearing sensors. The system may comprise a sensor. The sensor may comprise a sensor cover and a cover window arranged on the sensor cover. The system may further comprise a sensor motor for rotating the sensor cover and the cover window around an axis of rotation. The sensor cover and cover window may be rotated to clear the cover window of debris. The cover window may have a linear cross section in a plane that passes through and is perpendicular to the axis of rotation. The sensor motor may be configured to rotate the sensor cover and the cover window.

18 Claims, 8 Drawing Sheets

(56) References Cited

U.S. PATENT DOCUMENTS

| | | | | |
|---|---|---|---|---|
| 2011/0115973 A1* | 5/2011 | Tatewaki | ............... | G03B 17/02 |
| | | | | 348/373 |
| 2011/0266375 A1* | 11/2011 | Ono | ..................... | B60S 1/0848 |
| | | | | 239/589 |
| 2012/0117745 A1* | 5/2012 | Hattori | .................. | B60S 1/0848 |
| | | | | 15/250.01 |
| 2013/0028588 A1* | 1/2013 | Suman | ................... | G03B 17/00 |
| | | | | 396/448 |
| 2015/0344001 A1* | 12/2015 | Lopez Galera | ........... | B60S 1/56 |
| | | | | 134/198 |
| 2016/0238838 A1* | 8/2016 | Tago | ....................... | B08B 1/008 |

* cited by examiner

SELF-CLEANING SPINNING COVER

BACKGROUND

Vehicles are often subjected to environmental elements such as rain, snow, dirt, etc. Such environmental elements may cause a buildup of debris and contaminants on components of the vehicles, such as on sensors of the vehicle. The vehicle sensors may each include a cover to protect the internal sensor components from the debris and contaminants, but the cover itself may become dirty over time. As such, the functions of the internal sensor components may be impeded as signals transmitted and received by the internal sensor components may be blocked by the debris and contaminants.

SUMMARY

Embodiments within the disclosure relate generally to a system for clearing sensors. One aspect includes a sensor comprising a sensor cover and a cover window arranged on the sensor cover, a sensor motor for rotating the sensor cover and the cover window around an axis of rotation. The rotating sensor cover and cover window may be configured to clear the cover window of debris.

In some embodiments, the cover window may have a linear cross section in a plane that passes through and is perpendicular to the axis of rotation.

In some embodiments, wherein the sensor motor may be configured to rotate the sensor cover and the cover window at 600-900 rotations per minute.

In some embodiments, the sensor motor may be further configured to rotate the sensor cover and the cover window at 2000-3000 rotations per minute.

In some embodiments, the system may further comprise a debris sensor for monitoring the amount of debris on the sensor cover and cover window.

In some embodiments, the debris sensor may be configured to send a first signal to cause the sensor motor to activate upon detecting an amount of debris above a predetermined threshold.

In some embodiments, the debris sensor may be configured to send a second signal to cause the sensor motor to cease operation upon detecting an amount of debris below a predetermined threshold.

In some embodiments, the debris sensor may be configured to send a third signal to cause the sensor motor to rotate at an increased upon detecting a first debris which is not being ejected from the sensor cover.

In some embodiments, the cover window may be coated in a hydrophobic coating.

In some embodiments, the hydrophobic coating may increase a contact angle between the debris and the sensor cover.

In some embodiments, the cover window may be coated in a hydrophilic coating.

In some embodiments, the hydrophilic coating may decrease a contact angle between the debris and the sensor cover.

In some embodiments, the sensor may further comprise internal sensor components.

In some embodiments, the motor may be configured to rotate the internal sensor components at the same speed as the sensor cover and the cover window.

In some embodiments, a jet may be configured to project a liquid onto the sensor cover and cover window.

In some embodiments, the cover window may be tangent or offset from the axis of rotation.

In some embodiments, the cover window may be offset from the sensor cover such that there is an increasing tangential component of centripetal force which causes the debris to migrate away from the cover window In some embodiments, the cover window may be angled from the sensor cover such that there is an increasing tangential component of centripetal force which causes the debris to migrate away from the cover window.

In some embodiments, the sensor cover may have a shape with an increasing radial distance from the axis of rotation at positions away from the window such that there is an increasing tangential component of centripetal force which causes the debris to migrate away from the cover window.

In some embodiments, the system may include a vehicle and the sensor may be a sensor of the vehicle.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Figure 1:
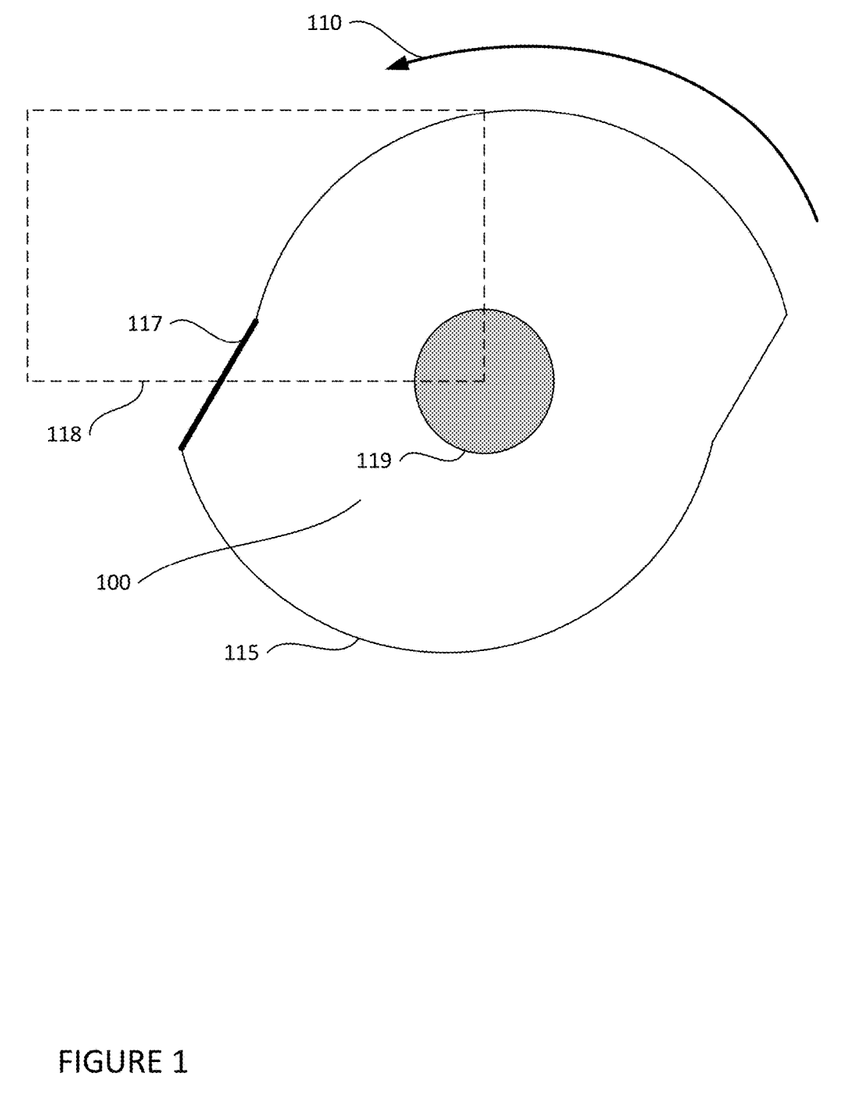
FIG. 1 is an illustration of a sensor in accordance with aspects of the disclosure.

This technology relates to clearing vehicle sensors of debris and contaminants to assure adequate operation. In this regard, a sensor may include a sensor cover to protect the internal sensor components from the debris, but the sensor cover itself may become dirtied over time. As such, the functions of the internal sensor components may be impeded where signals transmitted and received by the internal sensor components are blocked by the debris and contaminants. This debris and contaminants may be cleared from the sensor by rotating the internal sensor components in sync with a non-circular sensor cover. For instance, as shown in FIG. 1 the non-circular sensor cover 115 and internal sensor components 119 of a sensor 100 may be rotated on a first axis of rotation 110, thereby clearing the cover window 117 of debris by centrifugal force.

A vehicle sensor may be comprised of internal sensor components, a cover for housing the internal sensor components, and a cover window. The cover window may be constructed at a specific location on the sensor cover, which may be non-circular, and the internal sensor components may transmit and receive one or more signals through the cover window.

The sensor may be attached to a motor via a sensor shaft. In this regard, a first end of a sensor shaft may be attached to a motor and the opposite end of the sensor shaft may be connected to the sensor and cover. Upon the motor may rotating the sensor shaft, the entire sensor may also rotate.

The motor may rotate the sensor to remove debris and contaminants from the sensor. In this regard, the internal sensor components and the sensor cover may rotate in a first direction in synchronicity such that the internal sensor components are continually positioned to transmit and receive signals through the cover window.

By rotating the sensor with debris and contaminants on the sensor cover in the first direction, centrifugal force may be applied to the contaminants. The centrifugal force acting on the debris and contaminants may increase as the contaminants are forced further away from the center of the axis of rotation, thereby pulling the debris and contaminants towards the edge of the cover window.

A coating may be applied to the sensor cover and/or cover window to assist in the removal of the debris and contaminants from the sensor cover. In this regard, the coating which may be hydrophobic or hydrophilic in nature may reduce the surface tension at the sensor cover and/or cover window and/or create a thin film of water. As such, the amount of force needed to move the debris and contaminants off of the sensor cover and cover window may be reduced.

In some embodiments the sensor cover may be formed in non-circular configurations. For example, the sensor cover may be in the form of a rectangle with circular ends and an ellipse with an extending cover window, respectively.

A jet may assist in the removal of the debris and contaminants from the sensor cover. In this regard, the jet may apply a cleansing solution, such as water or detergent, onto the sensor cover to loosen the debris and aid blade in clearing the sensor cover of the debris.

The features described above may allow for continued use of a sensor even when the sensor's cover becomes dirty. By doing such, the sensor may continue operation without interruption or the need for an individual to manually clean the sensor, as the forces caused by the rotation of the sensor may continually clean the sensor cover or clean the sensor cover when needed. As such, the vehicle may continually operate in environments which produce a lot of debris, such as construction sites or off-road locations.

Figure 2:
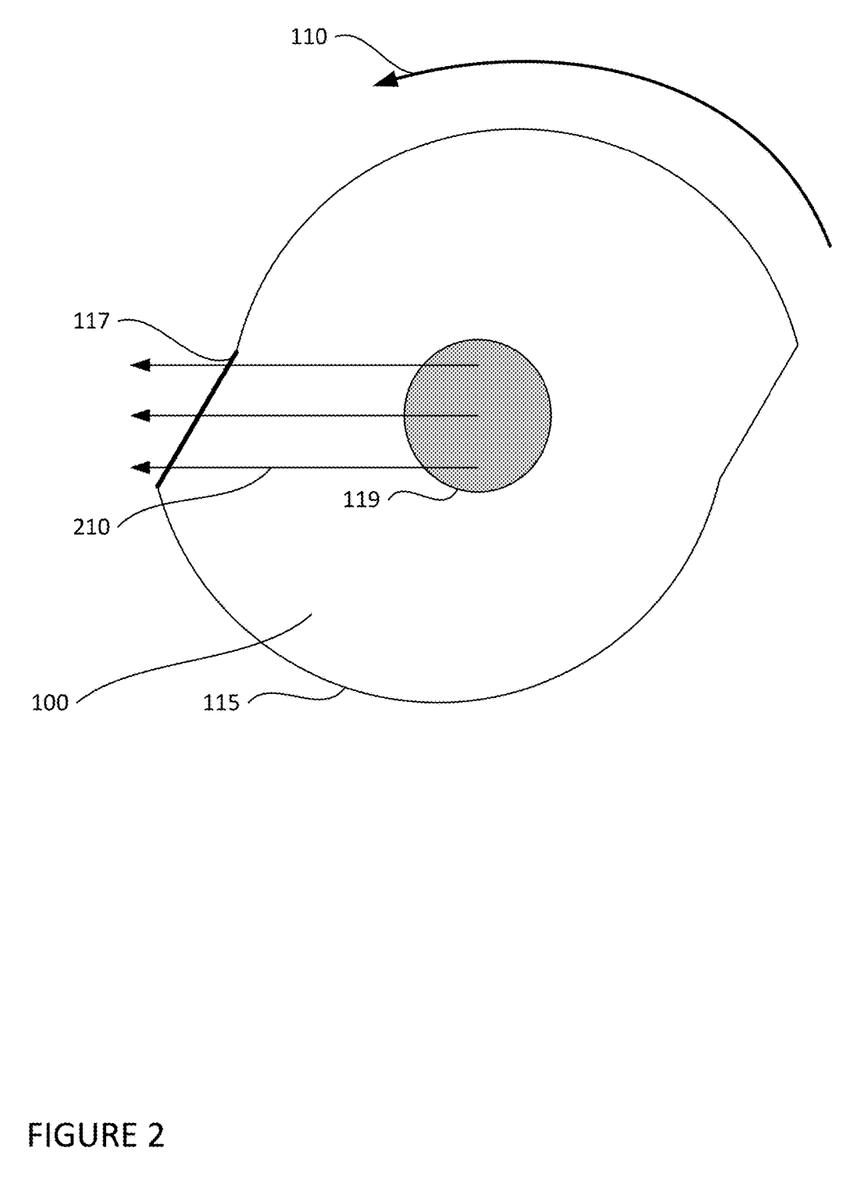
FIG. 2 is an illustration of a sensor in accordance with aspects of the disclosure.

The vehicle sensor may be configured to transmit and receive signals. For instance, as shown in FIG. 2, the vehicle sensor 100 may include a cover 115 for housing internal sensor components 119, and a cover window 117. The internal sensor components 119 may transmit and receive one or more signals 210 through at least a portion of the cover window 117. As an example, the vehicle sensor may include one or more LIDAR, radar, sonar, cameras, or other sensors.

The cover window may be constructed in a particular shape, and be constructed at a specific location on the sensor cover. In some embodiments the cover window may be composed of the same, or different, material as the sensor cover, such as glass, polycarbonate, polystyrene, acrylic, polyester, etc.

The cover window may be a portion of the sensor cover which is tangent or offset from the axis of rotation of the sensor cover, which may be non-circular. For example, as further shown in FIG. 2, the cover window 117 may be a linear portion of a non-circular sensor cover 115. The cover window 117 may be tangent to the rest of the sensor cover and offset from the axis of rotation 110. In other words, the cover window 117 has a linear cross section in a plane 118 that passes through and is perpendicular to the axis of rotation.

Figure 3:
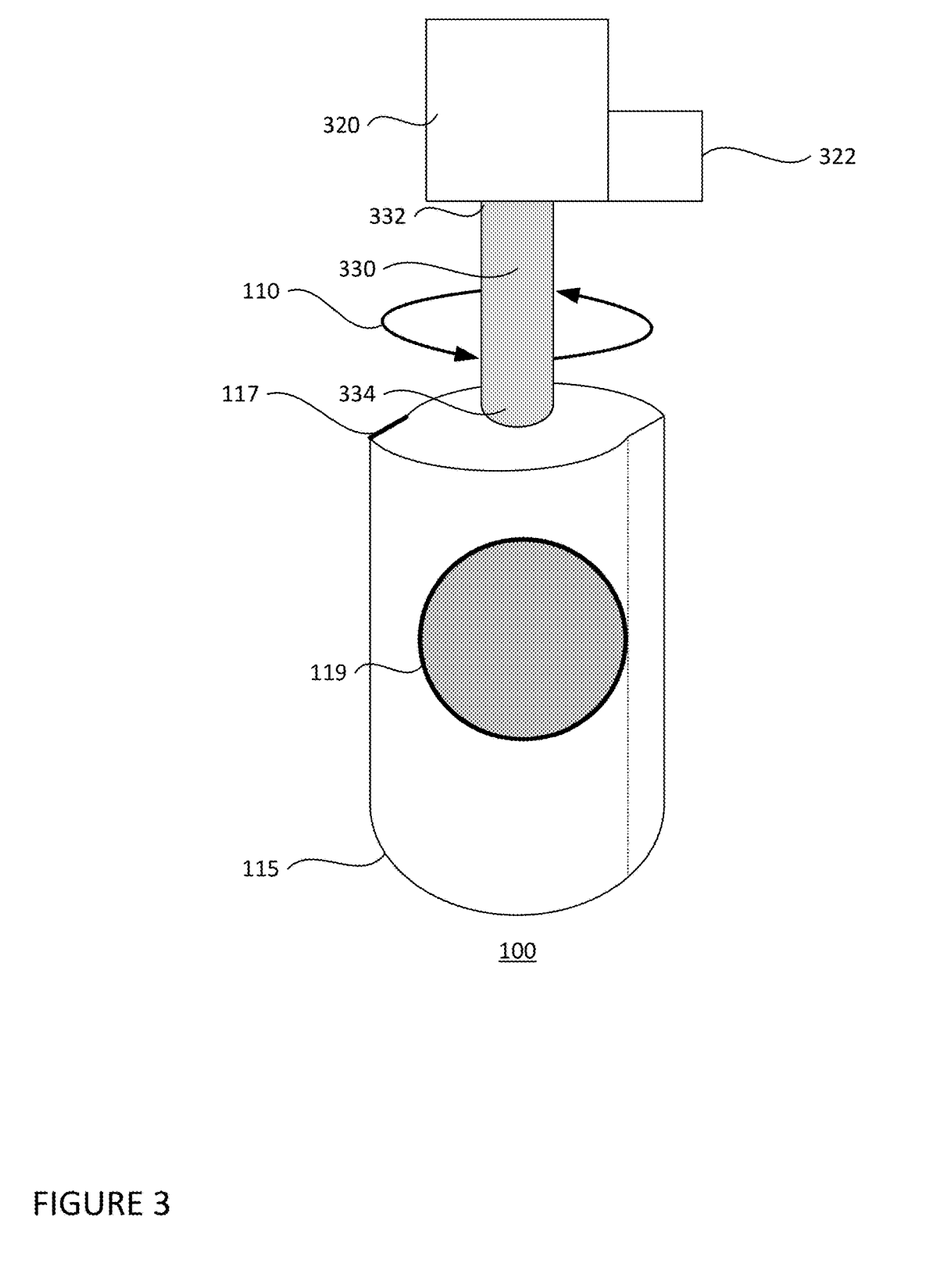
FIG. 3 shows a sensor attached to a motor in accordance with aspects of the disclosure.

The sensor may be attached to a motor via a sensor shaft. For instance, as shown in FIG. 3, the sensor shaft 330 may include a first end 332 and a second end 334. The first end of a sensor shaft 332 may be attached to a motor 320 and the second end 334 of the sensor shaft may be connected to the sensor 100. In this regard, the sensor shaft 330 may be attached to the sensor cover 115 and the internal sensor components 119, or just the sensor cover 115.

The internal sensor components and the sensor cover may rotate in synchronicity such that the internal sensor components are continually positioned to transmit and receive signals through the cover window. In this regard, the motor 320 may rotate the sensor shaft 330 on the first axis of rotation 110 causing the entire sensor, including the internal sensor components 119 and sensor cover 115 to also rotate on the first axis of rotation 110 simultaneously and at the same speed, as further shown in FIG. 3. By doing such, the sensor cover 115 may maintain the same position relative to the internal sensor components 119 while in rotation. As such, the internal sensor components may continually transmit and receive signals through the cover window 117 without interruption or signal degradation due to the sensor cover 115 blocking the signals.

In some embodiments the sensor shaft 330 may only rotate the sensor cover 115, and the stationary internal sensor components 119 may transmit and receive signals, such as one or more signals 210 when the cover window 117 is positioned to allow the signals to pass through. In some embodiments the sensor 100 and motor 320 may be located internally or externally from a vehicle.

Figure 4:
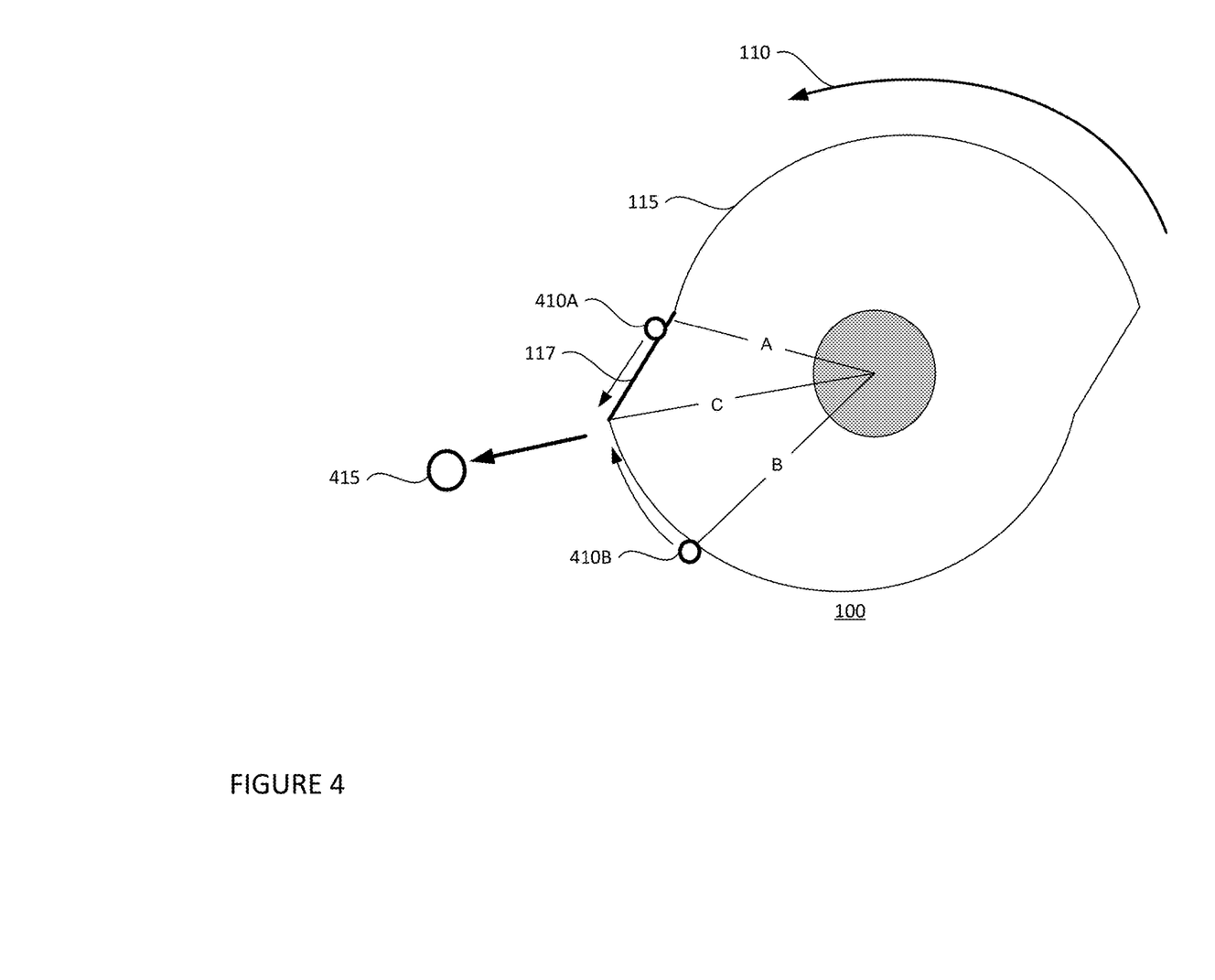
FIG. 4 is an example illustration of debris being ejected from a sensor in accordance with aspects of the disclosure.

The motor may rotate the sensor to remove debris and contaminants from the sensor cover. For instance, the motor 320 may rotate the sensor cover 115 with attached contaminants 410A and 410B on the first axis of rotation 110, as shown in FIG. 4. As the rotation speed of the sensor increases, the centrifugal force may also increase. This increasing centrifugal force may be applied to the contaminants 410A and 410B.

The centrifugal force may increase as the contaminants are forced further away from the center of the axis of rotation. For example, as the contaminants 410A and 410B move progressively further from the center of the axis of rotation. In this regard as contaminants 410A and 410B move from their initial positions located at distances of A and B from the axis of rotation, respectively, towards the edge of the cover window 117 at a distance of C from the axis of rotation, there may be an increasing component of the centrifugal force pulling the contaminants further towards the edge of the cover window 117, as further shown in FIG. 4.

Upon the contaminants arriving at the edge of the window, the net force on the contaminants may keep them sequestered away from the center of the cover window 117. The contaminants 410A and 410B may be ejected from the sensor cover 115, as shown by the contaminant 415, a combination of contaminants 410A and 410B being located at off of the sensor cover 115. Additionally, gravitational force may clear the contaminants downward and further away from the center of the cover window.

The rotational speed of the motor may be adjusted to create greater or lesser centrifugal force on the contaminants. In this regard, the motor 320 may cause the sensor to rotate around 900 rotations per minute, or more or less. When additional centrifugal force is needed to remove contaminants, the rotational speed of the sensor 100 may be increased to 3000 rotations per minute, or more or less.

In some embodiments a debris sensor may monitor the amount of debris on the sensor cover. In this regard, the debris sensor 322 may monitor the sensor cover to determine whether contaminants or debris are present on the sensor cover 115 and/or cover window, as further shown in FIG. 3. Upon determining a threshold number of contaminants or debris are present on the sensor cover, the debris sensor may provide a signal to activate the motor 320, thereby causing the sensor 100 to rotate. Upon determining the sensor cover 115 and/or cover window is clear of debris, or the debris level is below a predetermined threshold, the debris sensor may signal the motor to cease rotation. Additionally, the debris sensor may cause the motor to increase its rotational speed upon detecting debris which are not being ejected from the sensor cover, or an increasing number of debris are attaching to the sensor cover. In some embodiments the debris sensor 322 may be incorporated into sensor 100.

A coating may be applied to the sensor cover to assist in the removal of the debris and contaminants from the sensor cover. In this regard, the coating which may be hydrophobic or hydrophilic in nature may reduce the surface tension at the sensor cover and/or create a thin film of water. As such, the amount of force needed to move the debris and contaminants off of the sensor cover and cover window may be reduced. The hydrophobic coating may be a compound or treatment which may be removeably or permanently attached to the surface of the sensor cover. The hyrdrophic coating may increase the contact angle of contaminants to the surface of the sensor cover, thereby causing the contaminants, such as a liquid, to roll off more readily than on an untreated surface of the sensor cover. A hydrophilic coating may be a compound or treatment which may be removeably or permanently attached to the surface of the sensor cover. The hydrophilic coating may decrease the contact angle of the contaminants to the surface of the sensor cover, thereby causing the contaminants to more readily flow than on an untreated surface of the sensor cover.

Figure 5A:
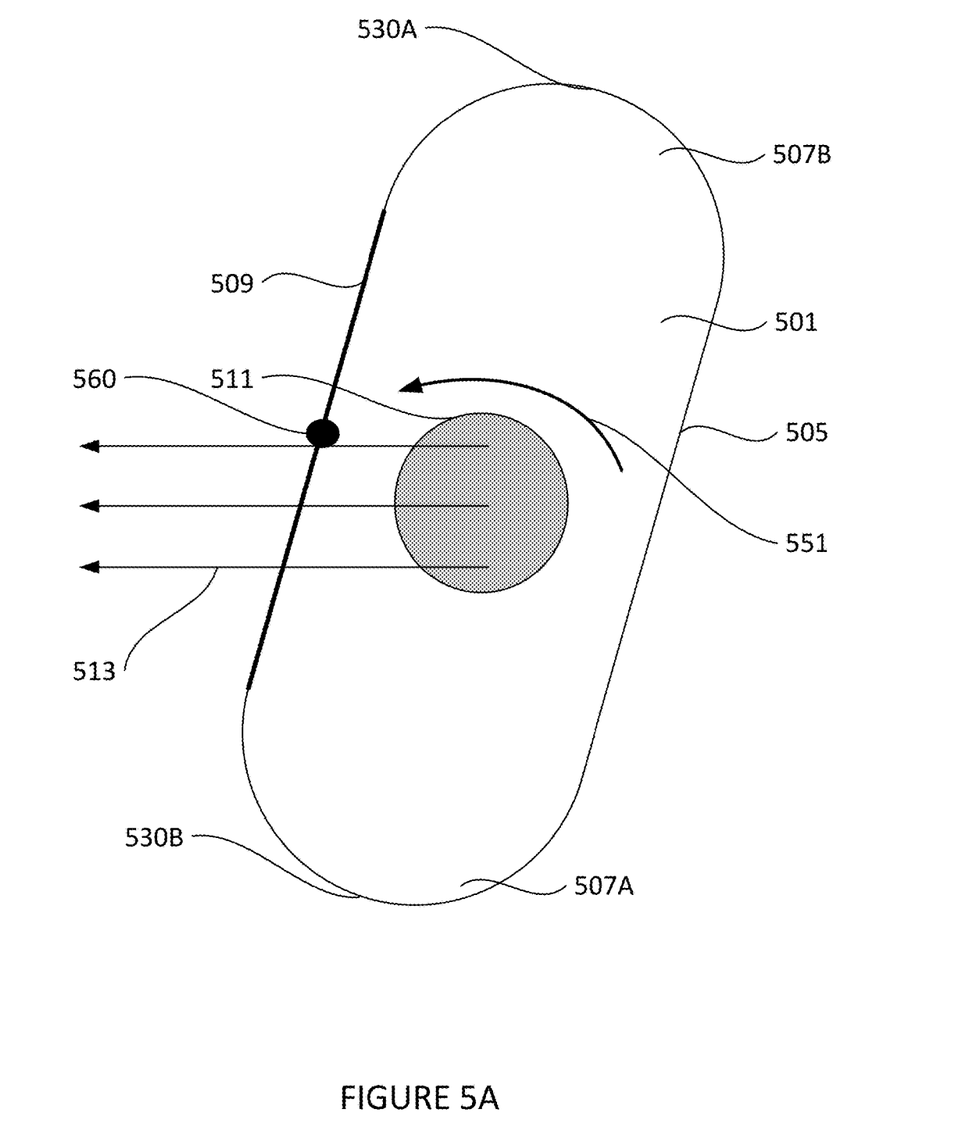
FIG. 5A-5C are example illustrations of sensors in accordance with aspects of the disclosure.

In some embodiments the cover may be formed in other non-circular configurations. For example, as shown in FIG. 5A, the sensor cover 505 of sensor 501 may be in the form of a rectangle having half-circular ends 507A and 507B. A cover window 509, through which signals 513 may be transmitted and received by the internal sensor components 511, comparable to internal sensor components 119, may be positioned on a linear portion of the sensor cover 505. In some embodiments, the cover window 509 may be configured such that the distance from the axis of rotation at one end of the cover window 509 is greater that the distance from the axis of rotation to the other end of the cover 509. As such, the cover window 509 may not be perpendicular to the signals 513.

Figure 5B:
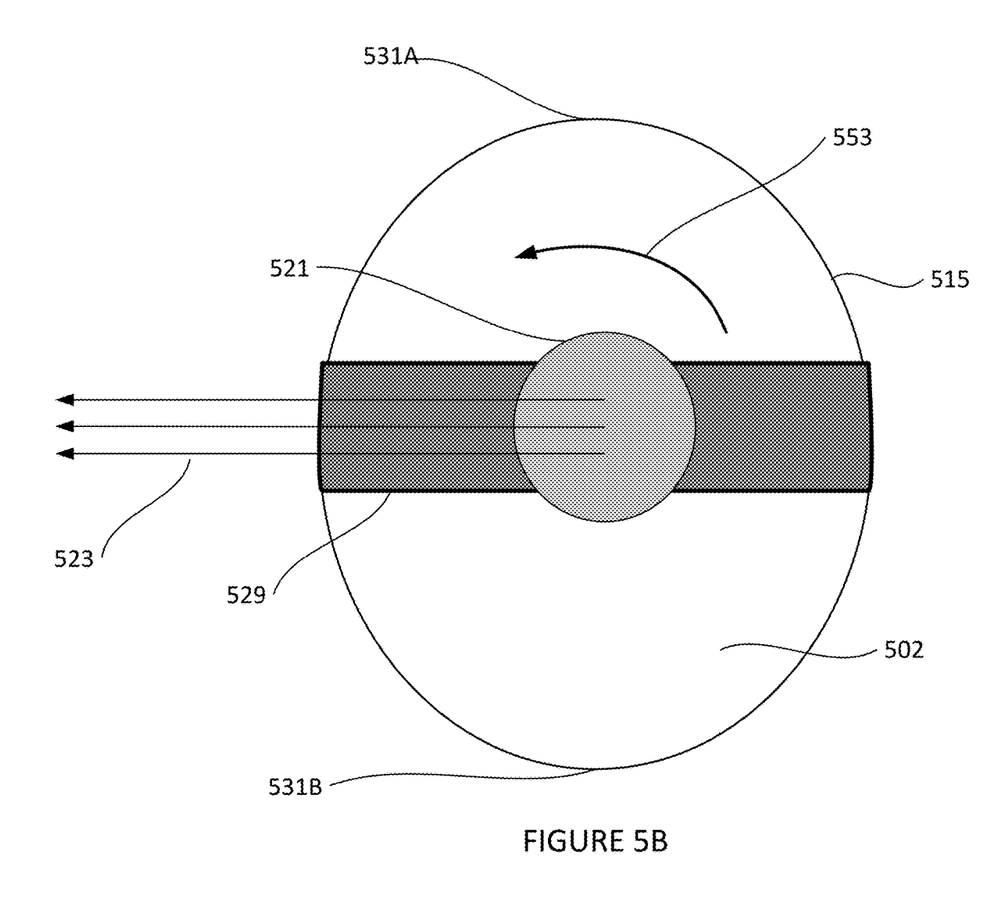

In the example shown in FIG. 5B, the sensor cover 515 of sensor 502 may be in the form of an ellipse with ends 531A and 531B. A cover window 529, through which signals 523 may be transmitted and received by the internal sensor components 521, comparable to internal sensor components 119, may be positioned on a portion of the sensor cover 515. The sensor cover 515 may have an increasing radial distance from an axis of rotation 553.

Figure 5C:
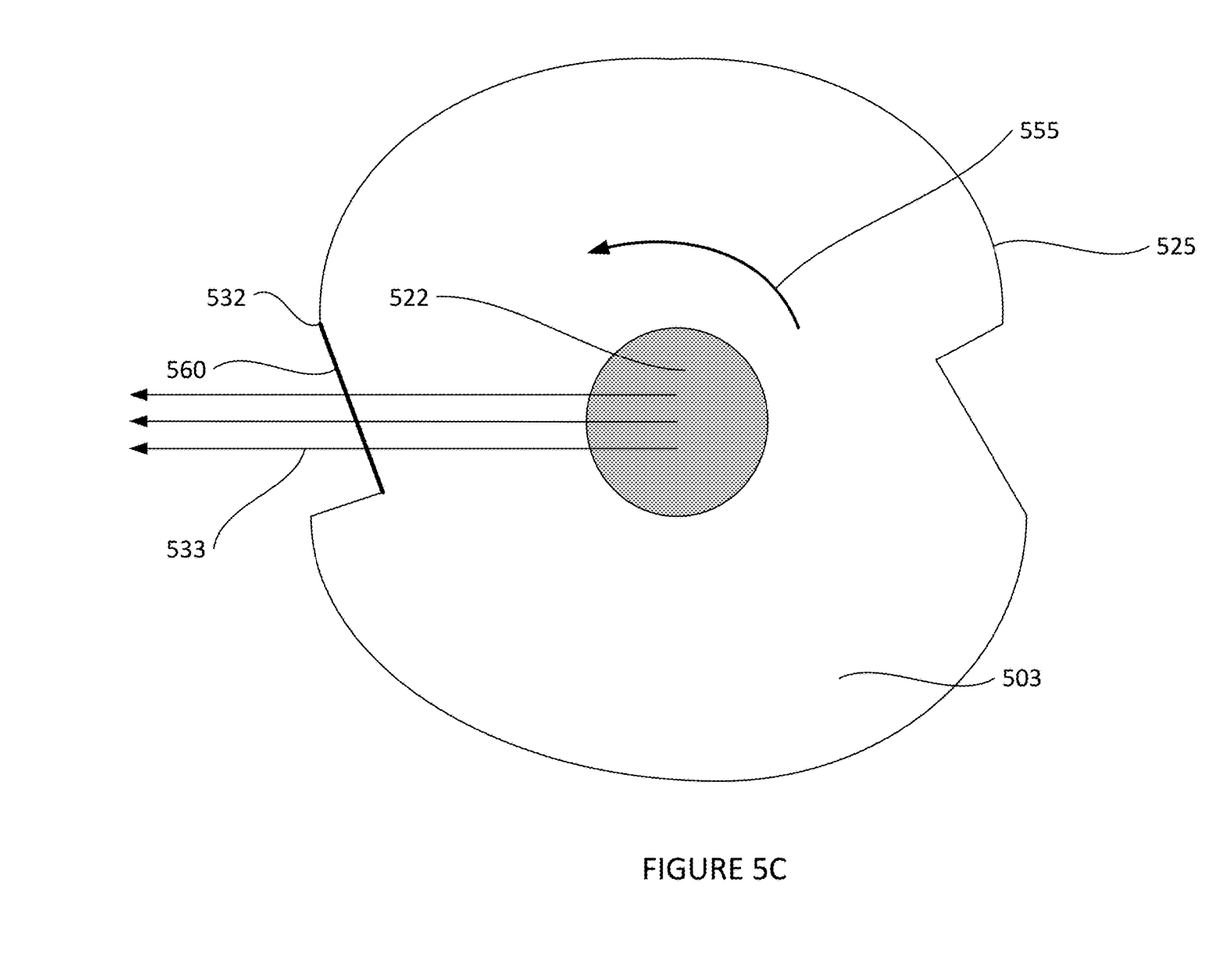

In the example shown in FIG. 5C, the sensor cover 525 of sensor 503 may be in the form of two offset, half circles connected with linear walls. A cover window 560, through which signals 533 may be transmitted and received by internal sensor components 522, comparable to internal sensor components 119, may be offset from the sensor cover 525.

As with the example of sensor 100, upon sensors 501, 502, and 503 being rotated around axis of rotations 551, 553, and 555, respectively, contaminants may be forced to the surfaces furthest from the center of the axis of rotation. For example, referring to FIG. 5A, contaminants may be forced to point 530A if the contaminants are positioned above midway point 560 or the contaminants may be forced to point 530B if the contaminants are positioned below the midway point 560 via centripetal force. Referring to FIG. 5B, contaminants may be forced to point 531A if the contaminants are positioned above the middle of the cover window 529 or the contaminants may be forced to point 530B if the contaminants are positioned below the middle of cover window 529 via centripetal force.

Figure 6:
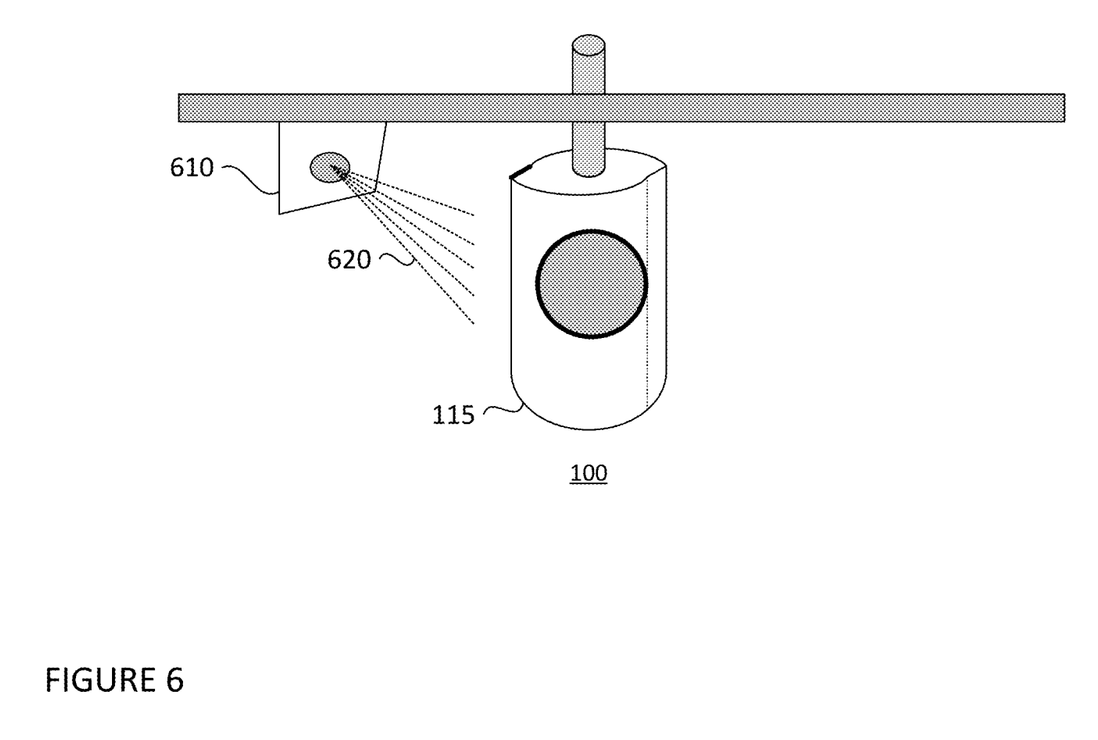
FIG. 6 shows a jet spraying a cleansing solution onto a sensor in accordance with aspects of the disclosure.

In some examples jet may apply a cleansing solution, such as water or detergent, onto the cover to assist in the removal of the debris and contaminants from the sensor cover. For example, as shown in FIG. 6, a jet 610 may be positioned outside of the range of operation (or field of view) of the sensor 100 (or any of sensors 501, 502, or 503). The jet 610 may spray a stream of cleansing solution 620 onto the sensor cover 115. The cleansing solution may assist the sensor in loosening the debris and contaminants from the sensor cover. Additionally, as the sensor rotates the cleansing solution may be forced from the sensor cover.

While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for clearing sensors comprising:
   a sensor comprising a sensor cover and a cover window arranged on the sensor cover; and
   a sensor motor for rotating the sensor cover and the cover window around an axis of rotation at 600-3000 rotations per minute;
   wherein the rotating sensor cover and cover window are configured to clear the cover window of debris.

2. The system of claim 1, wherein the cover window has a linear cross section in a plane that passes through and is perpendicular to the axis of rotation.

3. The system of claim 1, wherein the cover window is coated in a hydrophobic coating.

4. The system of claim 1, wherein the hydrophobic coating increases a contact angle between the debris and the sensor cover.

5. The system of claim 1, wherein the cover window is coated in a hydrophilic coating.

6. The system of claim 5, wherein the hydrophilic coating decreases a contact angle between the debris and the sensor cover.

7. The system of claim 1, wherein the sensor further comprises internal sensor components.

8. The system of claim 1, wherein the motor is configured to rotate the internal sensor components at the same speed as the sensor cover and the cover window.

9. The system of claim 1 further comprising a jet configured to project a liquid onto the sensor cover and cover window.

10. The system of claim 1, wherein the cover window is tangent or offset from the axis of rotation.

11. The system of claim 1, wherein the cover window is offset from the sensor cover such that there is an increasing tangential component of centripetal force which causes the debris to migrate away from the cover window.

12. The system of claim 1, wherein the cover window is angled from the sensor cover such that there is an increasing tangential component of centripetal force which causes the debris to migrate away from the cover window.

13. The system of claim 1, wherein the sensor cover has a shape with an increasing radial distance from the axis of rotation at positions away from the cover window such that there is an increasing tangential component of centripetal force which causes the debris to migrate away from the cover window.

14. The system of claim 1, wherein the system further comprises a vehicle and the sensor is a sensor of the vehicle.

15. The system of claim 1, wherein the system further comprises a debris sensor for monitoring the amount of debris on the sensor cover and cover window.

16. The system of claim 15, wherein the debris sensor is configured to send a signal to cause the sensor motor to activate upon detecting an amount of debris above a predetermined threshold.

17. The system of claim 15, wherein the debris sensor is configured to send a signal to cause the sensor motor to cease operation upon detecting an amount of debris below a predetermined threshold.

18. The system of claim 15, wherein the debris sensor is configured to send a signal to cause the sensor motor to rotate at an increased rate upon detecting a first debris which is not being ejected from the sensor cover.

* * * * *